Patented Sept. 11, 1923.

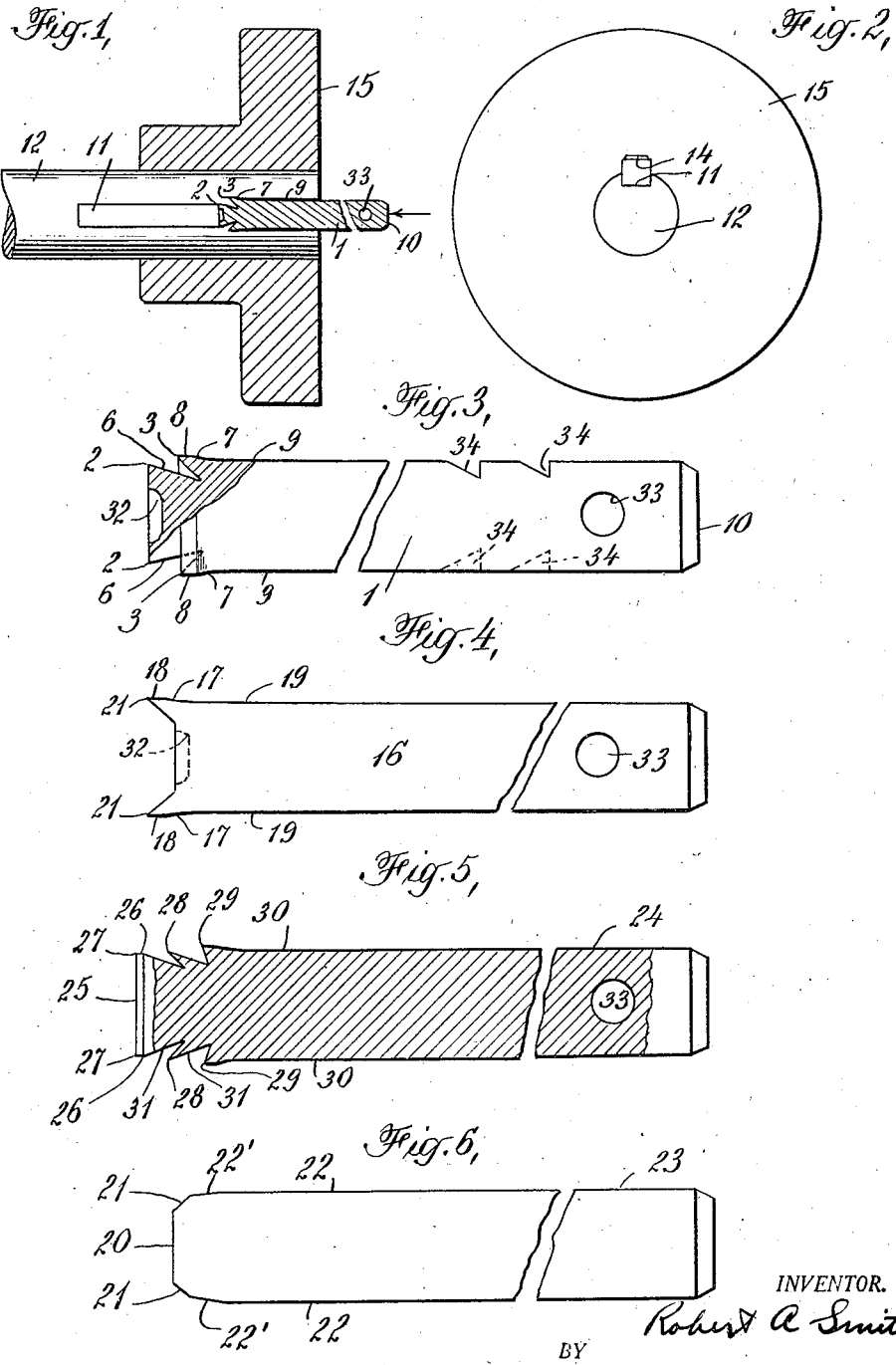

1,467,399

UNITED STATES PATENT OFFICE.

ROBERT A. SMITH, OF MAHWAH, NEW JERSEY, ASSIGNOR TO SMITH & SERRELL, A CO-PARTNERSHIP COMPOSED OF ROBERT A. SMITH, OF MAHWAH, NEW JERSEY, AND JOHN J. SERRELL, OF ELIZABETH, NEW JERSEY.

APPARATUS AND PROCESS FOR FITTING DRIVING KEYS.

Application filed January 23, 1922. Serial No. 531,148.

*To all whom it may concern:*

Be it known that I, ROBERT A. SMITH, a citizen of the United States, and resident of Mahwah, Bergen County, State of New Jersey, have made a certain new and useful invention relating to Apparatus and Processes for Fitting Driving Keys, of which the following is a specification, taken in connection with the accompanying drawing, which forms part of the same.

This invention relates especially to apparatus and processes for fitting driving keys in shafts and cooperating members by simultaneously finishing the usual rough keyway which is cut in the cooperating members by forcing or driving into the same a keyway cutter having a shank of substantially rectangular cross section and preferably having at least on its opposite driving faces one or more cutting edges which extend sufficiently beyond the shank of the cutter to give clearance thereto in most cases. Where several cutting edges are arranged on each face of the cutter they preferably extend out therefrom to increasing distances as they extend back along the shank of the cutter so that each cutting edge can remove several thousandths of an inch or more from the wall of the keyway, this chip or material being preferably retained in chip retaining recesses formed adjacent the rear cutting edges. When the cutter which is, of course, preferably given ample length, has been driven into the keyway for a sufficient distance it may be withdrawn by any suitable means for which purpose withdrawing notches, holes or other means may be formed on the cutter so as to cooperate with withdrawing tools or gripping means and remove the cutter from the fitted keyway. A correspondingly sized rectangular sectioned key of hard or soft steel and preferably having a somewhat tapered or inclined front end may then be forced or driven into the fitted keyway to accurately unite the parts and form a firm and strong driving connection between them. In this way accurate fitting and filing is obviated and since the keyway is finished or accurately sized by this special keyway cutter while the shaft and cooperating member are assembled a much more accurate fit and effective connection is secured through the finally inserted key as well as practically obviating expensive handwork in this connection.

In the accompanying drawing showing in a somewhat diagrammatic way several illustrative embodiments of the invention Fig. 1 is a section showing the fitting or finishing of a keyway and Fig. 2 is an end view thereof.

Fig. 3 is an enlarged view partly in section showing a keyway cutter for this purpose.

Figs. 4 and 5 are similar views showing other cutters, and

Fig. 6 is a view of a key for use in this connection.

As indicated in Figs. 1 and 2 the ordinary rough slotted or milled keyways 11, 14 may be formed in any desired way in the cooperating parts such as the shaft 12 and flange or other cooperating member 15, for example. The keyway cutter 1 may have one or more cutting edges such as 2, 3 on at least one of the driving faces of the cutter such as its upper or lower notched edge as it appears in Fig. 3 and where several such cutting edges are arranged on a single face of the cutter they preferably extend out therefrom to different distances, the rearmost cutting edge or surface, such as 8, extending out a few thousandths of an inch or more beyond the shank 9 of the cutter with which it may be joined by the inclined surfaces 7, if desired. This gives considerable clearance to the cutter shank as it is driven or otherwise forced into the keyway and where several cutting edges are used on each face of the cutter, chip retaining recesses such as 6 are preferably provided adjacent the rear cutting edges so as to receive or accommodate the chips or particles which are cut from the inner surface of the rough keyway. Especially where the cutter shank is approximately the same size as the finished keyway, or where the rear cutting surface 8 has substantial longitudinal extent, the cutter is quite accurately guided as it is hammered or otherwise forced into the keyway so that the keyway is quite accurately finished or fitted in this way and the work is done very quickly since the cutter may, of course, be driven in three or four inches where necessary in a very short time. The sizing cutter is then withdrawn from the keyway as by driving it clear through the same in some cases or preferably by withdrawing the cutter from the keyway in a rearward direction and to facilitate this, withdrawing means such as suitable notches or holes may be formed in the cutter shank adjacent its rear driving end 10. One or more transverse withdrawing holes such as 33 may extend in either direction through the cutter shank and withdrawing notches such as 34 may be formed on its sides or edges so as to be engaged by the claw ends of bars or other tools so as to quickly and certainly withdraw the cutter. Also, if desired, a front end socket or centering depression such as 32 may be formed in the front end of the keyway cutter so that a drift pin or similar device driven into the other end of the keyway may be engaged or centered thereby and assist in drifting out the cutter where this method of withdrawal is used.

Fig. 4 shows another illustrative cutter 16 having a single cutting edge 21 on each of its opposite driving faces 19. These cutting edges and the corresponding substantially parallel cutting surfaces 18 may, with advantage, project outward somewhat from the faces 19 of the cutter shank so as to give sufficient clearance therefor and tapering portions 17 may be formed adjacent the cutting surfaces, if desired. One or more withdrawing holes 33 may be formed in the rear or driving end of the cutter and, if desired, a front socket or centering depression 32 may be formed therein. Another desirable form of keyway cutter for this process is shown in Fig. 5 as comprising three cutting edges 27, 28 and 29, formed on each of the driving faces 30 of the cutter 24 while chip recesses 31 of ample size and capacity may be provided in connection with the rear cutting edges. If desired also one or more transverse cutting edges such as 25 may be formed on one or both of the other faces of the cutter between the driving faces 30 so that in this case three or sometimes four of the inner surfaces of the rough keyway may be accurately finished and sized by driving the cutter into the same. One or more of these cutting edges may be formed with substantially parallel cutting surfaces such as 26 which are especially desirable in the case of the rear or final cutting surfaces which can thus more certainly maintain their size and shape.

Such a cutter, which is preferably formed of special or tool steel and suitably hardened and tempered at least adjacent its cutting surfaces, may be used many times in sizing such rough keyways and then after being withdrawn from the keyway a correspondingly sized key, such as 23, may be driven into the fitted keyway in the shaft and cooperating member so as to securely and rigidly hold them in position and furnish a strong and reliable driving connection between them. The opposite driving faces 22 of this key should substantially correspond to the width of the fitted keyway or cutter finishing the same and it is advantageous in many cases to form the front end 20 of the key, which may be of soft or machinery steel or cold rolled stock, with a beveled portion 21 and also preferably with a gradually inclined or tapering surface 22' on one or both of the driving faces which materially assists in driving in the key. This method of fitting and inserting driving keys makes it possible to use relatively cheap keys which can be made up in quantity from cold rolled or other stock and a single special rectangular section cutter of corresponding size can, of course, finish and fit dozens of keyways for such purposes.

This invention has been described in connection with a number of illustrative embodiments, forms, shapes, proportions, sizes, materials, and numbers of parts, to the details of which disclosure the invention is not of course to be limited since what is claimed as new and what is desired to be secured by Letters Patent is set forth in the appended claims.

1. The apparatus for fitting driving keys in shafts and cooperating members, which comprises a keyway cutter having a shank of substantially rectangular cross section and having on each of its opposite driving faces a plurality of cutting edges extending substantially perpendicular to said shank and arranged at progressively increasing distances apart as they extend back along the shank of the cutter, the rear cutting edges extending out beyond the shank of the cutter to give clearance thereto, chip retaining recesses adjacent the rear cutting edges and withdrawing holes and notches in the shank of said cutter to withdraw the same from the keyway.

2. The apparatus for fitting driving keys in shafts and cooperating members, which comprises a keyway cutter having a shank of substantially rectangular cross section and having on several of its faces a plurality of cutting edges extending substantially perpendicular to said shank and arranged at progressively increasing distances apart as they extend back along the shank of the cutter, chip retaining recesses adjacent the rear cutting edges and withdrawing means formed in said cutter to withdraw the same from the keyway.

3. The apparatus for fitting driving keys in shafts and cooperating members, which comprises a keyway cutter having a shank of substantially rectangular cross section and having on more than two of its adjacent faces a plurality of cutting edges extending substantially perpendicularly to said shank and arranged at progressively increasing distances apart as they extend back along the shank of the cutter, the rear cutting edges extending out beyond the shank of the cutter to give clearance thereto, chip retaining recesses adjacent the rear cutting edges and withdrawing means to withdraw the cutter from the keyway.

4. The apparatus for fitting driving keys in shafts and cooperating members, which comprises a keyway cutter having a shank of substantially rectangular cross section and having on two of its faces a cutting edge extending substantially perpendicular to said shank and withdrawing means to withdraw the cutter from the keyway.

5. The apparatus for fitting driving keys in shafts and cooperating members, which comprises a keyway cutter having a shank of substantially rectangular cross section and having on two opposite faces a cutting edge extending substantially perpendicular to said shank and extending out beyond the shank of the cutter to give clearance thereto, and withdrawing means to withdraw the cutter from the keyway.

6. The apparatus for fitting driving keys in shafts and cooperating members, which comprises a keyway cutter having a shank of substantially rectangular cross section and having on two faces a cutting edge extending substantially perpendicular to said shank and extending out beyond the shank of the cutter to give clearance thereto.

7. The apparatus for fitting keys which comprises a keyway cutter having a shank of substantially rectangular cross section and having on opposite driving faces a plurality of cutting edges of progressively increasing distance apart, chip retaining recesses adjacent the inner cutting edges and withdrawing means in the cutter to withdraw the same from the keyway.

8. The apparatus for fitting keys which comprises a keyway cutter having a shank of substantially rectangular cross section and having on opposite driving faces a plurality of cutting edges of progressively increasing distance apart.

9. The apparatus for fitting keys which comprises a keyway cutter having a shank of substantially rectangular cross section and having on several faces a plurality of cutting edges extending outward beyond said shank to give clearance thereto, withdrawing means in the cutter to withdraw the same from keyway.

10. The apparatus for fitting keys which comprises a keyway cutter having a shank of substantially rectangular cross section and having on several faces a cutting edge extending outward beyond said shank to give clearance thereto.

11. The process of fitting driving keys in shafts and cooperating members which comprises driving into the rough keyway in the shaft and cooperating member a keyway cutter having a plurality of stepped cutting edges on the different faces of the cutter, withdrawing the cutter and forcing into the finished keyway a correspondingly sized driving key.

12. The process of fitting driving keys in shafts and cooperating members which comprises driving into the rough keyway in the shaft and cooperating member a keyway cutter having cutting edges on the different faces of the cutter, withdrawing the cutter and forcing into the keyway a driving key.

13. The process of fitting driving keys which comprises forcing into the rough keyway in the assembled shaft and cooperating member a keyway cutter having a plurality of cutting edges on the opposite driving faces of the cutter, withdrawing the cutter and forcing into the finished keyway a correspondingly sized driving key fitting the keyway tightly on at least its opposite driving faces.

14. The process of fitting driving keys which comprises forcing into the keyway in the assembled shaft and cooperating member a keyway cutter having cutting edges extending substantially perpendicular to the length of the cutter and arranged on the opposite driving faces of the cutter, withdrawing the cutter and forcing into the finished keyway a correspondingly sized driving key fitting the keyway on at least its opposite driving faces.

ROBERT A. SMITH.